(12) United States Patent
Ancora et al.

(10) Patent No.: US 8,611,398 B2
(45) Date of Patent: Dec. 17, 2013

(54) PROCESS FOR PROCESSING MIMO DATA STREAMS IN A 3GPP HSDPA RECEIVER, AND RECEIVER FOR DOING THE SAME

(75) Inventors: Andrea Ancora, Nice (FR); Fabrizio Tomatis, Saint Laurent du Var (FR)

(73) Assignees: St-Ericsson SA, Plan-les-Ouates (CH); St-Ericsson (France) SAS, Grenoble (FR)

( * ) Notice: Subject to any disclaimer, the term of this patent is extended or adjusted under 35 U.S.C. 154(b) by 0 days.

(21) Appl. No.: 13/395,978

(22) PCT Filed: Sep. 16, 2010

(86) PCT No.: PCT/EP2010/005693
§ 371 (c)(1),
(2), (4) Date: Apr. 27, 2012

(87) PCT Pub. No.: WO2011/032699
PCT Pub. Date: Mar. 24, 2011

(65) Prior Publication Data
US 2012/0275491 A1    Nov. 1, 2012

(30) Foreign Application Priority Data
Sep. 17, 2009  (EP) ..................................... 09368029

(51) Int. Cl.
*H04B 1/00*         (2006.01)
(52) U.S. Cl.
USPC ............ 375/148; 375/260; 375/267; 375/299
(58) Field of Classification Search
USPC .......................... 375/144, 148, 260, 267, 299; 370/203–211
See application file for complete search history.

(56) References Cited

U.S. PATENT DOCUMENTS

| | | | |
|---|---|---|---|
| 2005/0100052 A1* | 5/2005 | Mailaender et al. .......... | 370/479 |
| 2006/0072449 A1 | 4/2006 | Kent et al. | |
| 2006/0072514 A1* | 4/2006 | Kent et al. ..................... | 370/335 |
| 2009/0190645 A1* | 7/2009 | Li et al. ........................ | 375/229 |

OTHER PUBLICATIONS

International Preliminary Report on Patentability issued in corresponding International application No. PCT/EP2010/005693, mailed Mar. 20, 2012.
International Search Report issued in corresponding International Application No. PCT/EP2010/005693, mailed Jan. 24, 2011.
Written Opinion of the International Searching Authority issued in corresponding International Application No. PCT/EP2010/005693, mailed Jan. 24, 2011.
Juntti, Markku et al.: "Space-Time Equalizers for MIMO High Speed WCDMA Downlinks", IEEE Transactions on Wireless Communications, IEEE Service Center, Piscataway, NJ, US, vol. 6, No. 7, Jul. 1, 2007, pp. 2582-2592, XP011187609, ISSN: 1536-1276, entire document.

* cited by examiner

*Primary Examiner* — Curtis Odom
(74) *Attorney, Agent, or Firm* — Patent Portfolio Builders PLLC

(57) ABSTRACT

A MIMO receiver for processing N data streams received by N antennas for a direct-sequence spread-spectrum wireless communication system comprising a linear equalizer operating at the chip level for performing linear chip level Inter-Chip Interference and all Inter-Stream Interference cancellation of said N data streams, and generating N output chip level data streams; de-spreading blocks for separately de-spreading the N outputs of the linear equalizer; and a non linear detector for performing spatial equalization and multi-stream detection.

11 Claims, 5 Drawing Sheets

PROCESS FOR PROCESSING MIMO DATA STREAMS IN A 3GPP HSDPA RECEIVER, AND RECEIVER FOR DOING THE SAME

TECHNICAL FIELD

The invention relates to the field of wireless communication and more to particularly to a process for processing multiple MIMO data streams in a 3GPP HSDPA communication system, and a receiver for doing the same.

BACKGROUND ART

High Speed Downlink Packet Access (HSDPA) is a packet based data service feature of the in WCDMA standard providing high speed downlink transmission. HSDPA is a technology upgrade to current UMTS networks.

In Release 7 3GPP Standard, Multiple Input Multiple Output (MIMO) HSDPA is supported to double the nominal achievable data rate.

Compared to SISO/SIMO case (rel. 6 and previous), the HSDPA receiver must support improve to perform time and spatial equalization.

MIMO has significant impact on the UE receiver algorithms & complexity
   baseline receiver is linear Mean Minimum Squared Equalizer (MMSE) w/o interference cancellation
   enhanced receiver would be nonlinear with different options for interference cancellation Some techniques are known in the prior art in order to provide such time and spatial equalization.

A first known technique is illustrated in FIG. 1 which shows a MIMO HSDPA receiver which includes a joint time-spatial LMMSE chip level equalizer 10 providing both temporal and spatial equalization of the two received streams. Furthermore, equalization 10 achieves the decoding of the Dual Transmission Adaptive Array (DTx-AA) standard.

Once equalized, the two received streams are separately processed in parallel.

A first processing path includes a dispreading block 11, a Log Likehood Computation Ratio (LLR) Comp. block 12, a Rx HARQ block 13 and a decoding block 14. Dispreading block 11 achieves downsampling of the received chip level sequence in order to generate the sequence of symbols. Rx HARQ block 13 handles the packet retransmission procedure defined in the above mentioned 3GGP standard while decoding block 14 embodies known channel decoding technique, such as based on turbo-codes.

Similarly, the second stream outputted by joint time/spatial equalizer is processed by a dispreading block 15, a Log Likehood Computation Ratio (LLR) block 16, a Rx HARQ block 17 before being decoded by a decoding block 18.

The first technique shown in FIG. 1 suffers one main drawback consisting in the high complexity of the joint time-spatial LMMMSE which has to provide effective time and spatial equalization. Such block is rather complex to embody, and particularly because it has to operated at the chip level frequency.

Other techniques are known which are based on a Serial Interference Cancellation (SIC) arrangement.

FIG. 2 shows one second known technique—also known under the designation V-blast—which is based on such a SIC structure comprising a 2×1 MMSE equalization block 20 which only provides joint time-spatial equalization of one particular stream complying with one criterium such as, for instance, the power. Such stream is then processed by one single path comprising, similarly as in the first technique, a dispreading block 21, a Log Likehood Ratio (LLR) block 22, a Rx HARQ block 23 and a decoding block 24.

FIG. 2 also shows that a cancellation loop is arranged between the output of LLR block 22 and the input of 2×1 MMSE equalizer block, comprising a hard decision block 26, a signal reconstruction block 25 comprising estimation of the channel and having the purpose of re-generating the chip level sequence corresponding to the first signal.

Thanks to that cancellation loop, the chip level sequence corresponding to the signal received from the first antenna can be suppressed before being reprocessed by equalizing block 20 for the purpose of decoding the second signal.

A second type (type 2) of a SIC is further illustrated in FIG. 3 which differs from the second known technique in that the cancellation loop is connected at the output of the decoding block.

FIG. 3 illustrates such a SIC receiver of the second type which includes a 2×1 MMSE equalization block 30 providing temporal and spatial equalization of the higher power received signal, then following by a dispreading block 31, a Log Likehood Ratio (LLR) block 32, a Rx HARQ block 33 and a decoding block 34. Once the higher level signal has been decoded, the latter is re-encoded by encoder 37, then forwarded to a Tx-HARQ block 36 managing the transmission of packets, and then processed by a signal reconstruction block 35 which regenerate, taking into account the channels characteristics estimation, the chip level sequence corresponding to the first signal.

As shown in the FIG. 2, the cancellation loop regenerates the chip level sequence corresponding to the first signal which can then be suppressed from the signal of the corresponding antenna so as the equalizing block 30 may equalize, process and decode the second signal.

That first known technique, based on the SCI (type 2), shows higher complexity and latency than the SIC of the first type. Conversely, it provides higher performance.

However the two SIC structures which are illustrated in FIGS. 2 and 3, respectively, requires additional storage for successively storing the sequence of data being processed before the whole 2-step-equalization completes. In addition, it should be noticed that 2×1 MMSE equalizers 20 and 30, although being of less complexity than the linear 2×2 MMSE equalizer of FIG. 1, have to operated a at frequency being double than the chip level rate.

The need of additional storage and the increase in the frequency of operation of equalizers 20 and 30 finally also results in an increase of the manufacturing costs of the MIMO receiver.

Therefore, there is a desire for a new architecture of a MIMO receiver which, firstly, can be based on an equalization technique of reasonable complexity and, secondly, does not need additional storage for storing two successively processed streams of data.

SUMMARY OF THE INVENTION

It is an object of the present invention to provide the architecture of a MIMO receiver adapted for a direct-sequence (DS) spread-spectrum system.

It is a further object of the present invention to provide a MIMO receiver suitable for the 3GPP HSDPA standard.

It is still another object of the present invention to provide a process and a MIMO receiver which reduces the manufacturing costs.

It is another object of the present invention to provide receiver wherein time equalization is performed jointly on the two received stream (channel shortening operation) and where the spatial equalization is performed by a non linear stage such as a Sphere Decoder.

These and other objects of the invention are achieved by means of a MIMO receiver which comprises:

a first linear equalizer operating at the chip level for performing linear chip level Inter-Chip Interference (ICI) and all Inter-Stream Interference (ISI) cancellation (Channel Shortening) of said N data streams, and generating N output chip level data streams;

de-spreading blocks for separately de-spreading the N outputs of said first linear equalizer (40);

a second non linear detector for performing spatial equalization and multi-stream detection.

By limiting the operations of the first linear equalizer to the sole time equalization, complexity of the latter can still remain acceptable.

On the other side, the fact that spatial non linear detector only processes the data stream at the symbol rate reduces its complexity so that the complexity of the whole MIMO receiver remains acceptable.

In one embodiment, the MIMO receiver comprises two data stream.

Particularly, the second non linear detector is a NEAR-Maximum Likehood detector, and preferably a Sphere Decoder.

The invention also provides a user Equipment for a 3GPP HSDPA communication system, such as a mobile phone or a Portable Document Assistant.

The invention also provides a method for processing a set of N MIMO data stream in a receiver of a direct-sequence (DS) spread-spectrum wireless communication, comprising the following steps:

receiving via N antennas N data streams of information encoded and modulated by a pseudonoise (PN) sequence;

performing a linear chip level Inter-Chip Interference (ICI) and all Inter-Stream Interference (ISI) cancellation and outputting N data streams;

de-spreading said N data streams in order to convert them at the symbol rate;

performing spatial multi-stream detection.

In one embodiment, the spatial multi-stream detection is performed by means of a non-linear near-Maximum Likehood detection, such as based on a Sphere Decoder.

DESCRIPTION OF THE DRAWINGS

Other features of one or more embodiments of the invention will best be understood by reference to the following detailed description when read in conjunction with the accompanying drawings.

DESCRIPTION OF THE PREFERRED EMBODIMENT

Figure 4:
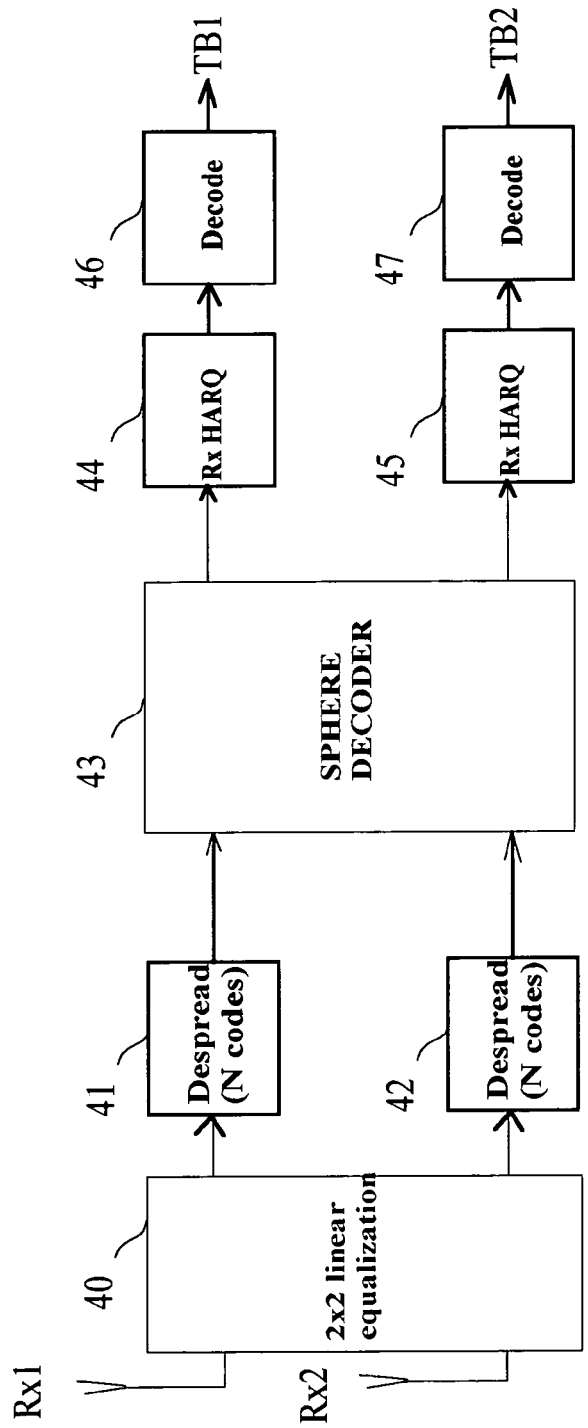
FIG. 4 illustrates the principle of a MIMO receiver in accordance with the present invention.

With respect to FIG. 4, there is now described the architecture of one MIMO receiver which is particularly suitable for embodying a 3GPP HSDPA MIMO receiver. In particular, the receiver processes the D-TxAA precoded data streams.

However it should be clear that the architecture of the invention is general and can be applied to any other form of decoding. More generally, the skilled man may use the invention in order to embody any MIMO receiver for a direct-sequence (DS) spread-spectrum system and any value of spreading factors.

The invention can be implemented in digital electronic circuitry forming a mobile telephone of a Portable Digital Assistant (PDA) including hardware circuits with a combination of firmware and software.

The MIMO receiver of FIG. 4 comprises a first linear equalization block 40 receiving a set of N data streams received at N antennas, and carrying information encoded and modulated by a pseudonoise (PN) sequence and transmitted over a communication channel.

For the sake of clarity, only two data streams have been illustrated in FIG. 4 but it is clear that the invention can be used for any number of data streams and antennas.

The key point of the invention is that, contrary to the prior art techniques evoked above, first linear equalization block 40 only performs a linear chip level Inter-Chip Interference (ICI) and all Inter-Stream Interference (ISI) cancellation (Channel Shortening).

In particular, no spatial detection is being performed by block 40 so as to keep the complexity of the latter at a relatively acceptable level.

Indeed, while first linear equalization is performed at the chip level rate (operating at a frequency rate being much higher than the symbol rate, e.g. 16 times higher), it should be noticed that the complexity of the first linear equalizer still remain acceptable since only time equalization is being performed in block 40, at the exclusion of any spatial equalization, particularly complying with the D-TxAA precoding.

In the embodiment illustrated in FIG. 4 linear equalizer 40 only provides time equalization (also called channel shortening) for two separate streams respectively received by the two antennas. Such channel shortening is well known to a skilled man and for the sake of clarity there is no need to further develop the details of the procedures and techniques used for achieving suppression of Inter Symbol Interference (ISI).

First equalizer outputs N channel shortened data streams which are respectively forwarded to a corresponding number of de-spreading blocks for the purpose of downsampling the equalized chip level sequences.

FIG. 4 shows two dispreading blocks, respectively 41 and 42, which respectively converts the chip level sequences of the first and the second output of linear equalizer 40 into the symbol streams.

The MIMO receiver further comprises a second spatial multi-stream detection block 43 receiving, at N inputs, the N sequences of symbols respectively outputted by the N de-spreading blocks (e.g. blocks 41-42 of FIG. 4).

Non linear detection block 43 achieves complex spatial equalization as well as detection of the despreaded streams, but takes a significant advantage on the fact that such operations are being performed at the rate of the Symbol level, thus keeping the complexity relatively acceptable.

It results from that novel and inventive architecture that both linear equalizer 40 and non linear detection block 43 still have a complexity remaining at an acceptable level.

Firstly, linear equalizer 40 has its complexity still acceptable since, although operating at the chip level rate, it only performs channel shortening thus significantly limiting the digital processing resources being required.

Secondly, non linear detector block 43 also has its complexity remaining at an acceptable level since, although it performs simultaneous parallel of N streams (N=2 in FIG. 4), the processing is performed at the Symbol level rate, what significantly limits complexity.

Figure 1:
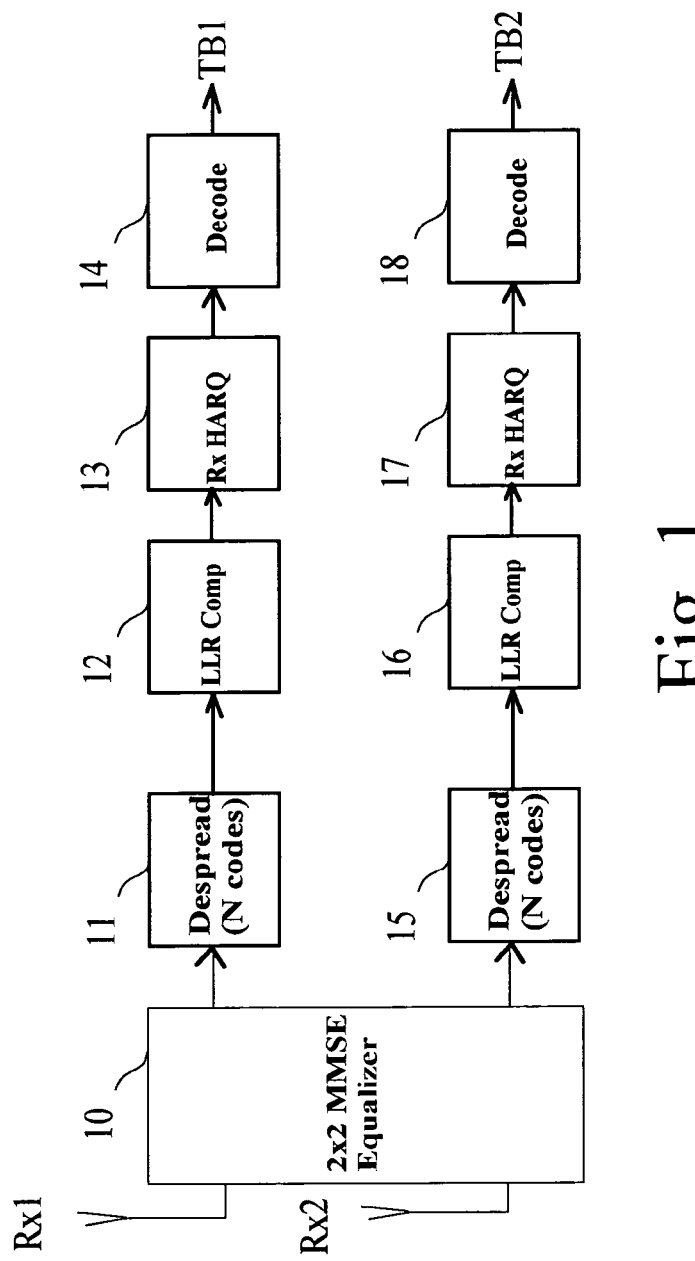
FIG. 1 illustrates a first known technique for a MIMO receiver for standard 3GPP HSDPA
Figure 2:
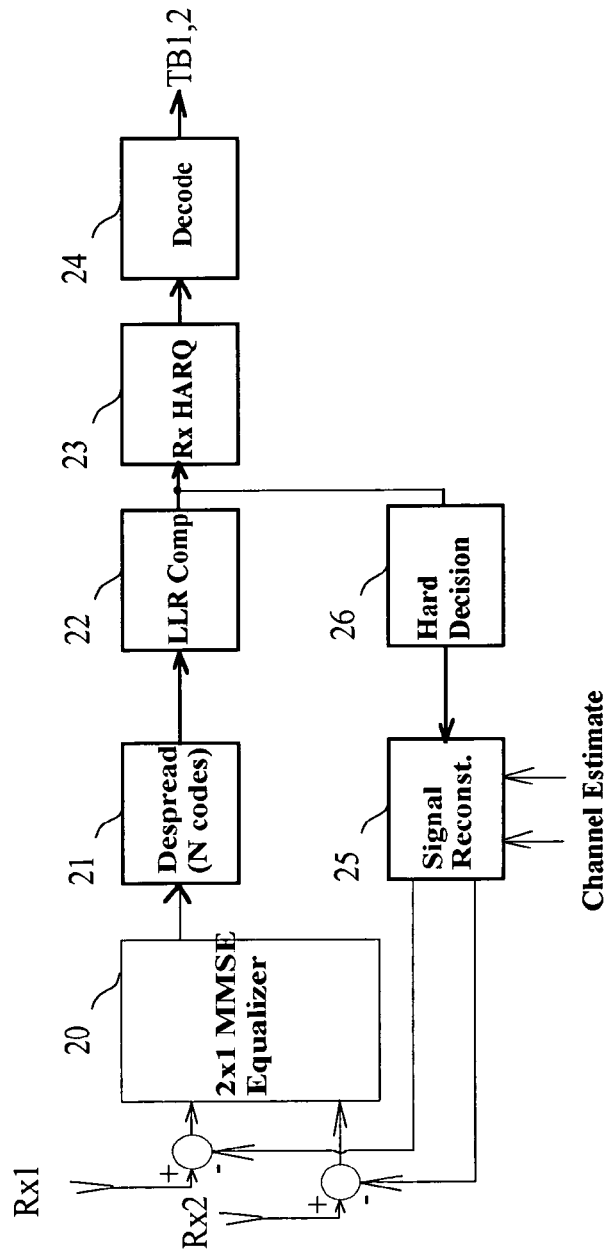
FIG. 2 illustrates a second known technique for a MIMO receiver for standard 3GPP HSDPA
Figure 3:
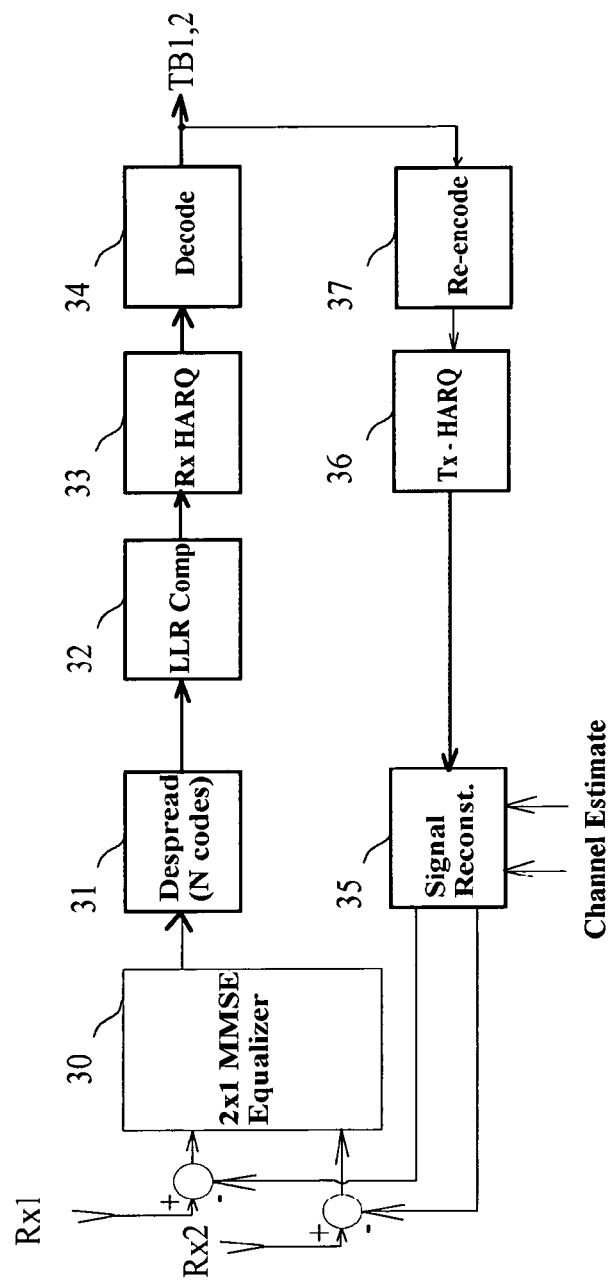
FIG. 3 illustrates a third known technique for a MIMO receiver for standard 3GPP HSDPA

Conversely, all the equalizers of the prior art (see FIGS. 1-3) operating at the chip level rate achieved both time and spatial equalization what resulted in significant complexity resulting in higher manufacturing costs. Known techniques of FIGS. 2 and 3 tried to reduce somewhat the complexity resulting from the need to perform both time and spatial equalization by perform consecutive processing of the two data streams.

The invention significantly improves that situation by clearly separating, on one side, the cancellation of ISI which is performed by first linear equalizer 40 operating at the chip level rate and, one the other side, the spatial multi-stream detection which is achieved more easily after the de-spreading of the data streams.

Non linear detector block 43 may be embodied in different ways.

In one embodiment it can be embodied on the basis of a Maximum Likehood (ML) or, more practically, with a near-ML decoder.

In particular, as shown in FIG. 4, the spatial equalization and non linear detection is achieved by means of a 2×2 SPHERE DECODER.

Alternatively, the use of lattice reduction can be considered.

In addition to the non linear detection block 43, the MIMO receiver further includes N processing paths, each comprising a Rx HARQ block (resp. 44, 45) for handling the packets retransmission, and a decoding block (resp. 46 and 47) for implementing decoding techniques such as VITERBI decoding or Turbo-decoding.

Figure 5:
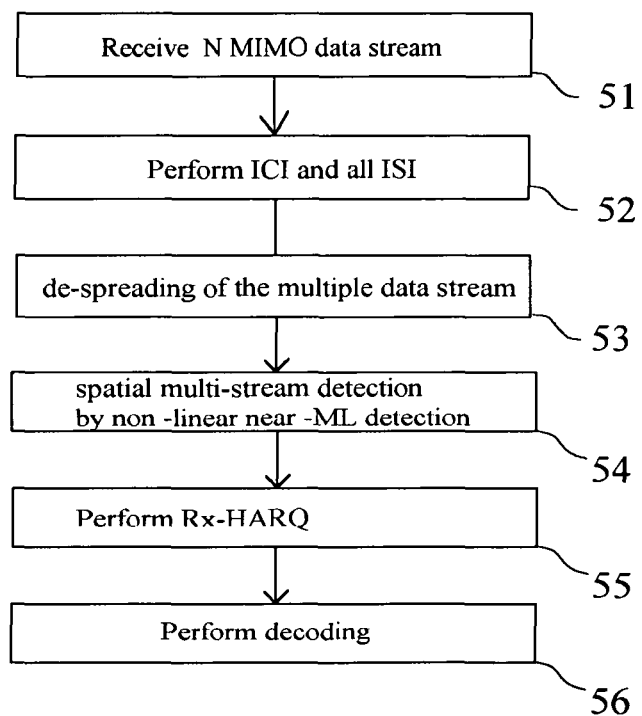
FIG. 5 illustrates the process according to the invention for processing the Multiple Input Multiple Output (MIMO) HSDPA data streams.

With respect FIG. 5 illustrates the process according to the invention for processing a number of N Input Multiple Output (MIMO) HSDPA data streams.

In a step 51, the process receives the MIMO streams of data coming from N antennas;

In a step 52, the process performs a linear chip level Inter-Chip Interference (ICI) and all Inter-Stream Interference (ISI) cancellation (Channel Shortening).

Then, in a step 53, the process proceeds with the de-spreading of the multiple data stream in order to convert them at the symbol rate;

Then in a step 54, the process processes with spatial multi-stream detection performed by non-linear or near-ML detection. In one embodiment, a Sphere Decoder is used for achieving that.

The process then proceeds with a step 55 where the different data stream, at the symbol rate, are parallely processed in accordance with Rx-HARQ standard.

In a step 56, the process proceeds with the final parallel decoding of the multiple stream of symbols.

By clearly separating, what was not done in the prior art techniques, one one side, the step of linear chip level Inter-Chip Interference (ICI) and all Inter-Stream Interference (ISI) cancellation (Channel Shortening) and, on the other side, the step of spatial multi-stream detection done by non-linear near-ML detection (Sphere Decoder), the invention achieves a MIMO receiver which can be effectively seen as a spatio-temporal equalizer then achieving decoding of DTxAA MIMO HSDPA transmission.

With the advantage that no latency introduced w.r.t to previous non-linear methods and, further more, there is no need of additional memory storage since there is no two consecutive processing of the parallely received data streams as in the second and third prior art technique.

The invention claimed is:

1. A Multiple In Multiple Out (MIMO) receiver for processing N data streams received by N antennas for a direct-sequence (DS) spread-spectrum wireless communication system comprising:
    a linear time equalizer operating at the chip level for performing linear chip level Inter-Chip Interference (ICI) and all Inter-Stream Interference (ISI) cancellation (Channel Shortening) of said N data streams, and generating N shortened output chip level data streams;
    de-spreading blocks for separately de-spreading the N outputs of said linear equalizer; and
    a non linear detector receiving said N shortened output chip level data streams for performing joint spatial equalization and multi-stream detection.

2. The MIMO receiver according to claim 1 wherein the number of data streams is two.

3. The MIMO receiver according to claim 1 wherein said non linear detector is a Near-Maximum Likehood detector.

4. The MIMO receiver according to claim 3 wherein said non linear detector is a SPHERE DECODER.

5. The MIMO receiver according to claim 1 wherein it further includes a Rx HARQ block for packets retransmission and a decoding block.

6. The MIMO receiver according to claim 1 adapted to a 3GPP HSDPA communication system.

7. A User Equipment for a 3GPP HSDPA communication system comprising two antennas for receiving two MIMO data streams, wherein it further includes:
    a linear equalizer operating at the chip level for performing linear chip level Inter-Chip Interference (ICI) and all Inter-Stream Interference (ISI) cancellation (Channel Shortening) of said N data streams, and generating N output chip level data streams;
    de-spreading blocks for separately de-spreading the N outputs of said linear equalizer; and
    a non linear detector receiving said N output chip level data streams for performing joint spatial equalization and multi-stream detection.

8. A process for processing a set of N MIMO data stream in a receiver of a direct-sequence (DS) spread-spectrum wireless communication, comprising the following steps:
    receiving via N antennas N data streams of information encoded and modulated by a pseudonoise (PN) sequence;
    performing a linear chip level Inter-Chip Interference (ICI) and all Inter-Stream Interference (ISI) cancellation and outputting N shortened chip level data streams;
    de-spreading said N shortened data streams in order to convert them at the symbol rate; and
    performing joint spatial multi-stream detection of said N despread shortened data streams.

9. The process according to claim 8 wherein said spatial multi-stream detection is performed by means of a non-linear near-Maximum Likehood detection.

10. The process according to claim 9 wherein said near-Maximum Likehood detection is based on a sphere decoder.

11. The process according to claim 8 wherein it is applied to HSDPA.

\* \* \* \* \*